United States Patent [19]

Vaslas

[11] 4,103,954
[45] Aug. 1, 1978

[54] SNOW SHOVEL

[76] Inventor: John W. Vaslas, 282 Park St., Staten Island, N.Y. 10306

[21] Appl. No.: 787,360

[22] Filed: Apr. 14, 1977

[51] Int. Cl.² .......................... A01B 1/22; E01H 5/02
[52] U.S. Cl. ........................................ 294/54; 294/58
[58] Field of Search ............... 294/54, 57, 58, 59; 15/143 R, 144 R, 145; 16/114 R; 37/53

[56] References Cited

U.S. PATENT DOCUMENTS

| | | | |
|---|---|---|---|
| 702,097 | 6/1902 | Haviland | 294/58 |
| 911,291 | 2/1909 | Byor | 294/58 |
| 1,083,054 | 12/1913 | Brown | 294/58 |
| 1,456,879 | 5/1923 | Newman | 294/58 |
| 2,229,053 | 1/1941 | De Vaux | 37/53 |
| 2,416,414 | 2/1947 | Spencer | 294/58 |
| 3,082,554 | 3/1963 | Steeb | 294/58 X |
| 3,751,094 | 8/1973 | Bohler | 294/58 |

*Primary Examiner*—Johnny D. Cherry
*Attorney, Agent, or Firm*—Norbert F. Holler

[57] ABSTRACT

A snow shovel having a plate-shaped scoop, a main handle and an adjustable auxiliary handle, arranged so as to enable snow to be shoveled without the user having to bend over, is disclosed. The main handle is a rod rigidly affixed to one end to the scoop and having a first hand grip at th other end. The auxiliary handle includes a pair of rods which diverge from one another in the direction from closely juxtaposed first ends to widely spaced second ends. A second hand grip is secured to the auxiliary handle rods at the first ends thereof, and respective hinges interconnect the auxiliary handle rods at their second ends to the scoop adjacent the top edge thereof. A rigid cross-brace bar, which may be medially foldable, is swivelly connected at one of its ends to the auxiliary handle rods adjacent the juncture thereof with the second hand grip and is releasably locked at its other end to the main handle rod for adjustability to different positions. The auxliary handle structure per se may be combined ith existing, conventional show shovels by providing the free ends of the auxiliary handle rods and the cross-brace bar with suitable, preferably quick-disconnect, coupling means. This abstract is not to be taken either as a complete exposition or as a limitation of the present invention, however, the full nature and extent of the invention being discernible only by reference to and for the entire disclosure.

14 Claims, 14 Drawing Figures

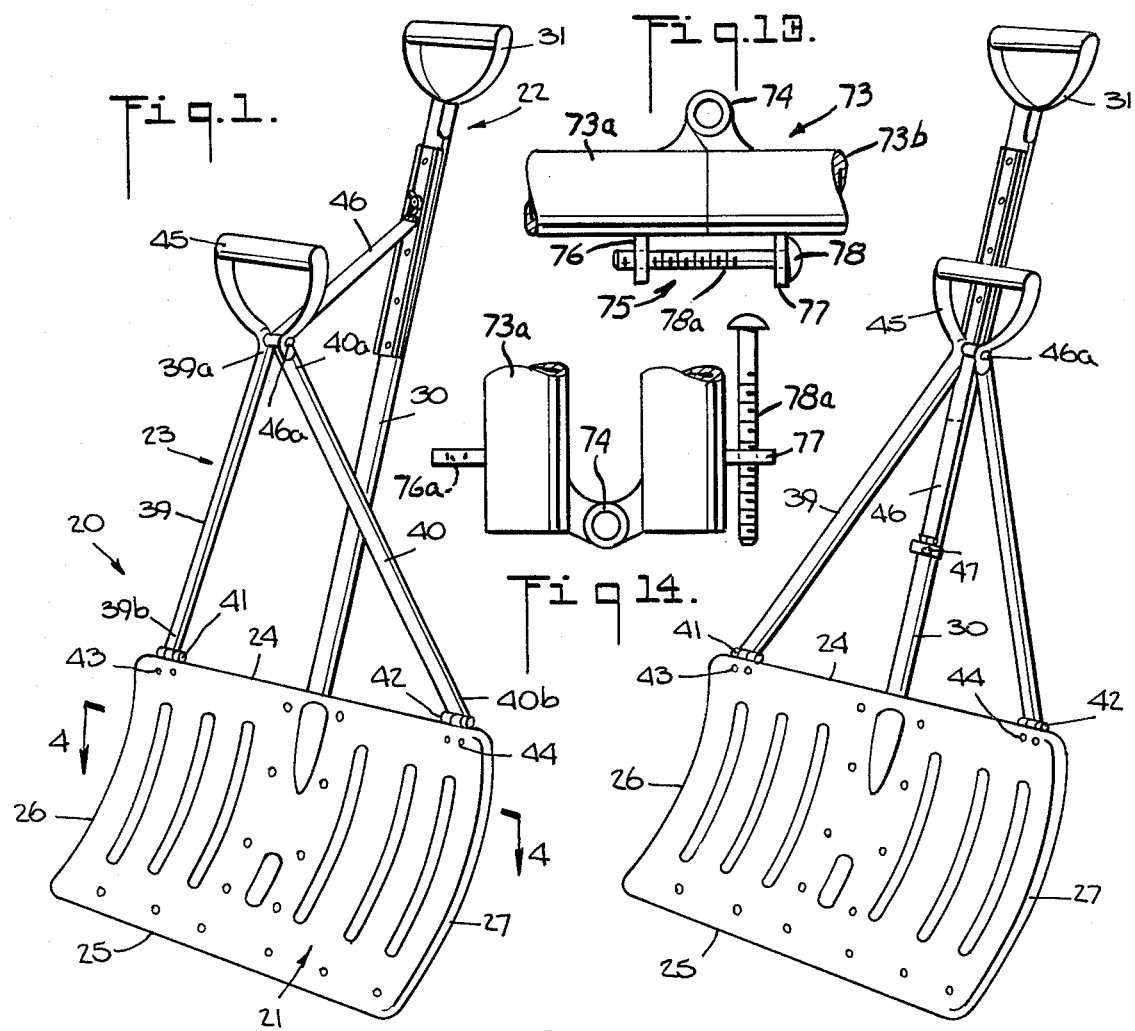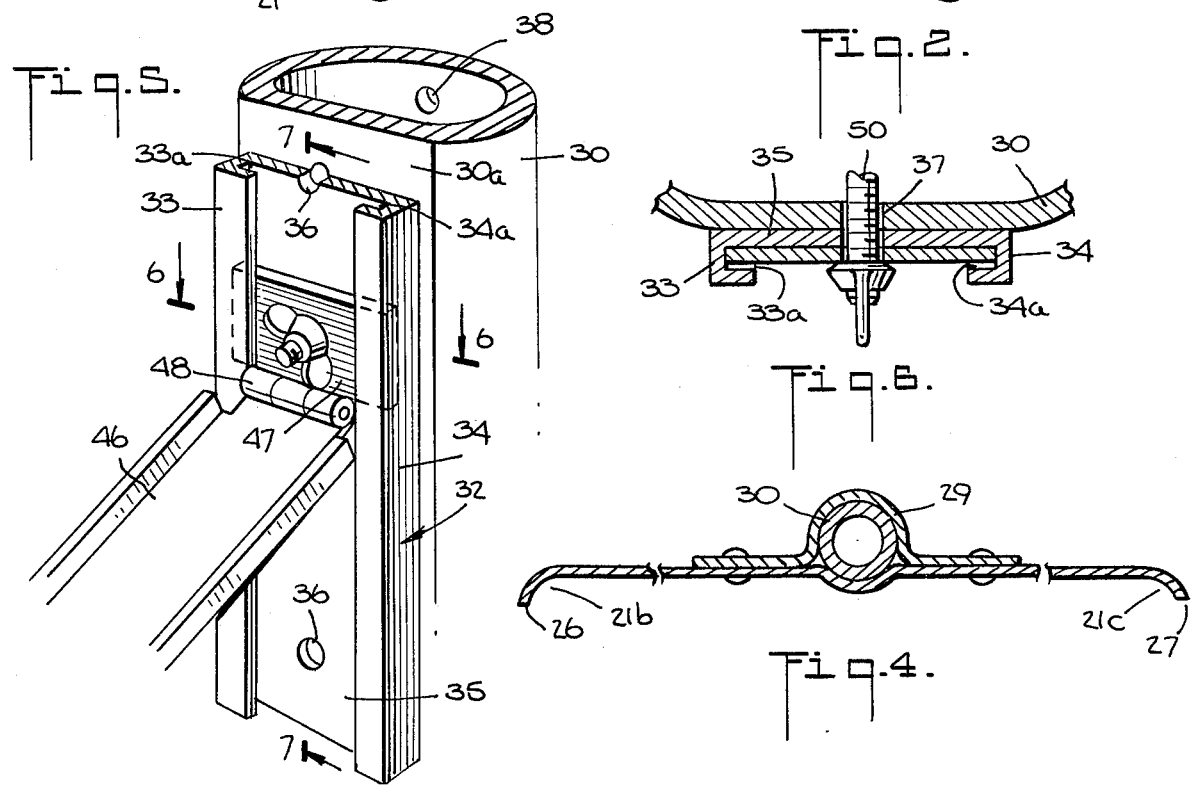

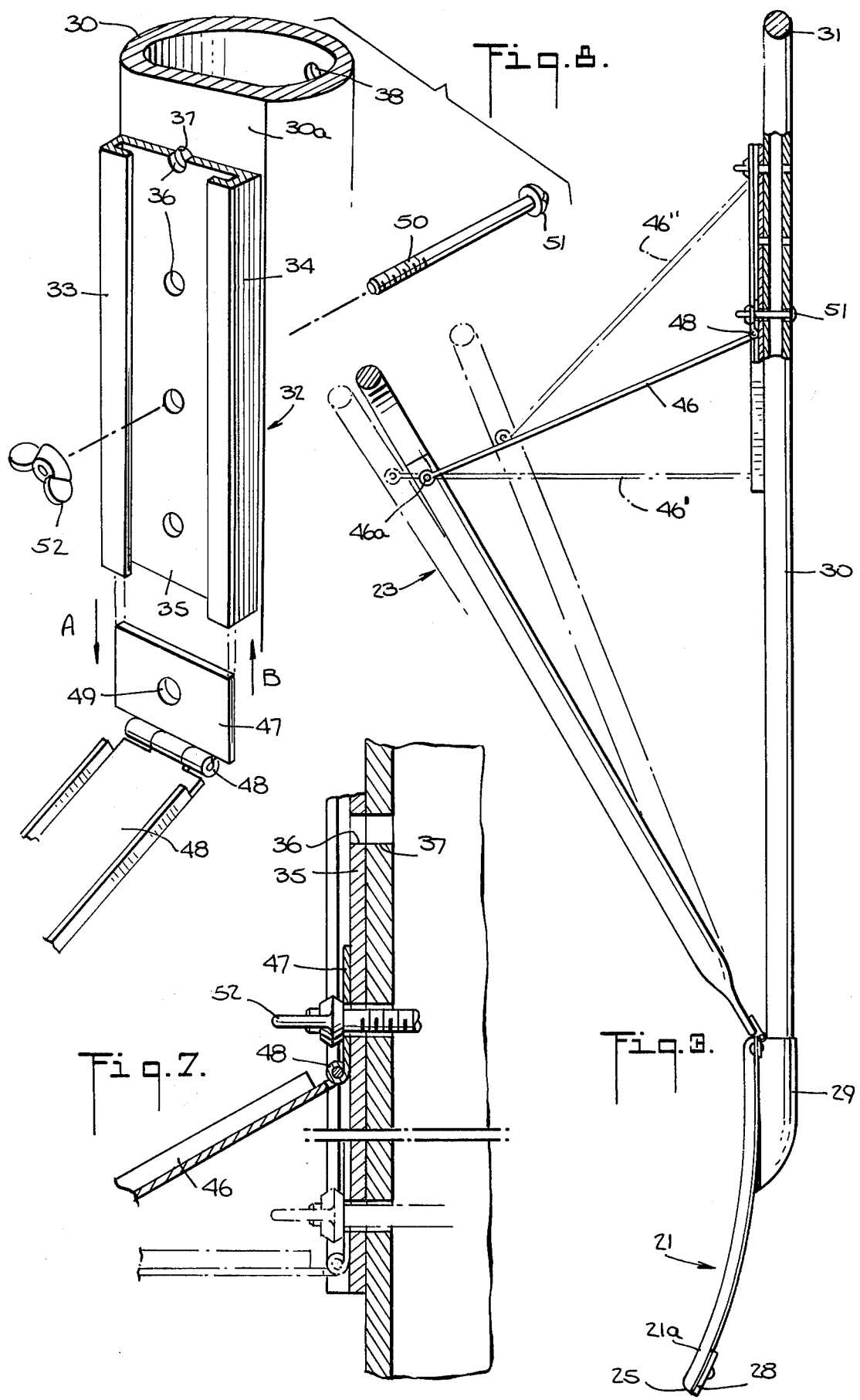

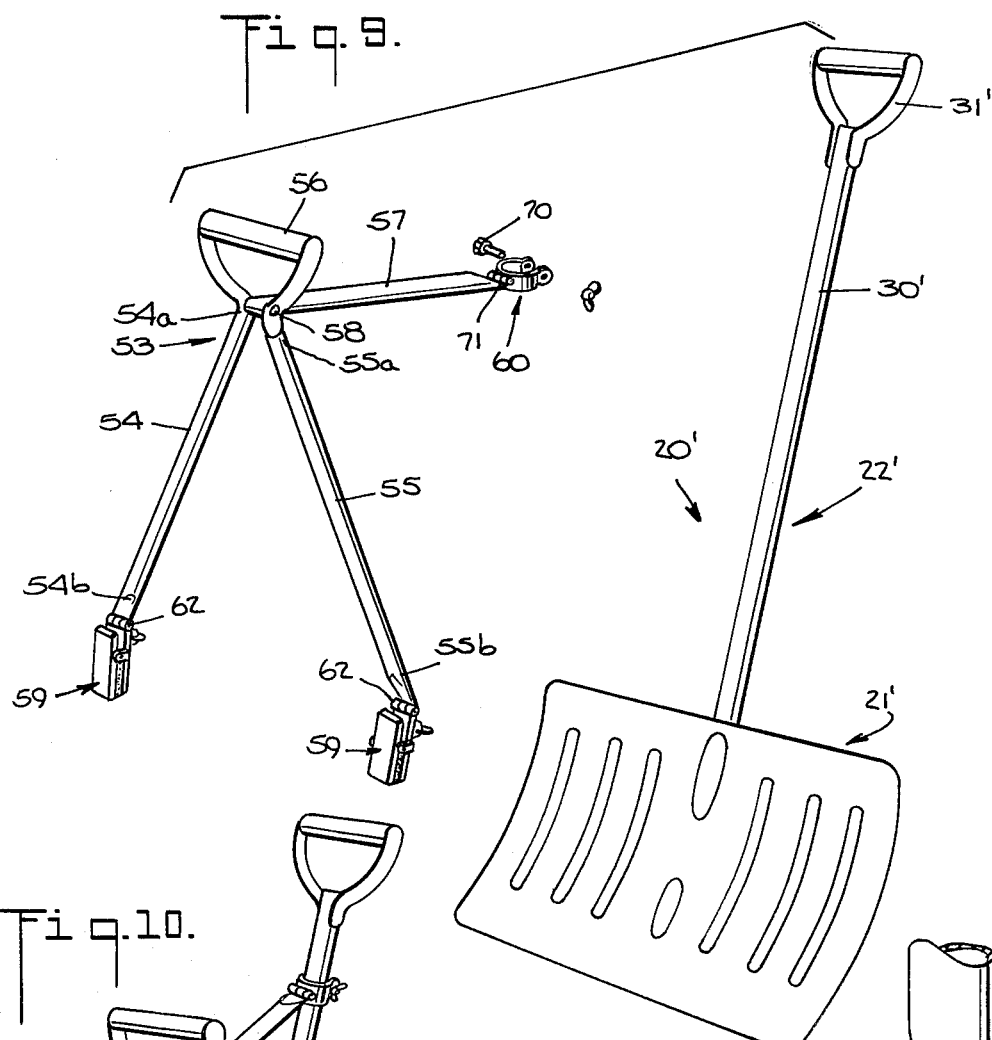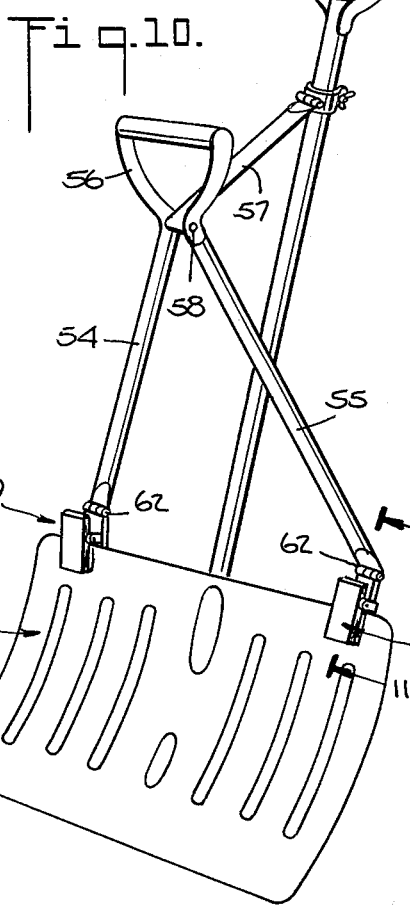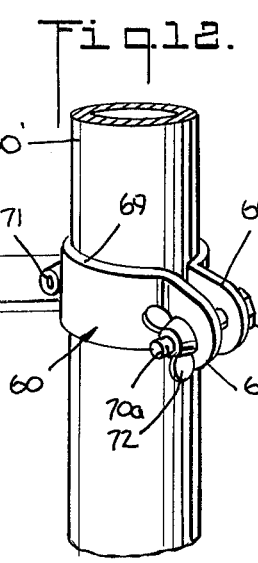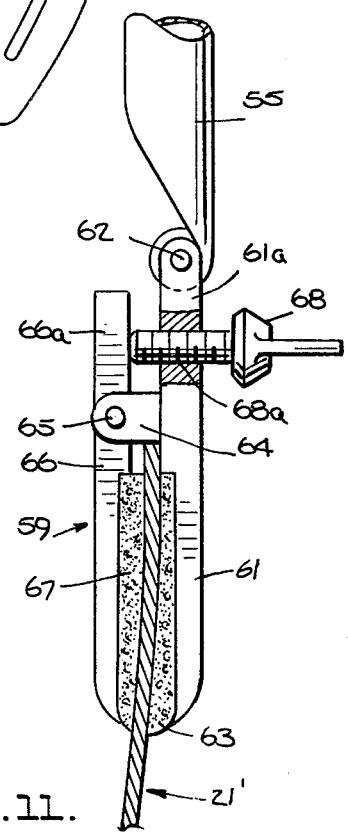

SNOW SHOVEL

This invention relates to snow shovels, and more particularly to snow shovels which have a modified handle structure so as to enable the user to shovel snow without having to bend over and thus without having to exert undue strains on his back.

Conventional snow shovels which are presently on the market are all, insofar as the applicant is aware, composed of a ground-engaging blade or scoop and a handle rod rigidly affixed thereto. The user of such a shovel normally first pushes it along the ground while walking in an upright position and holding the shovel by the usual handle grip affixed to the upper end of the handle rod, to break up and dislodge a quantity of snow. When the shovel is full, the user shifts his position to one side of the shovel and bends over, grasping the handle rod with one hand at the hand grip and with the other hand at a location fairly close to the scoop in order to obtain sufficient leverage. By pulling the lower section of the handle rod upwardly, the user then raises the scoop and can toss the mass of snow thereon to one side or the other.

As anyone who has ever shoveled snow will readily attest, this activity can be extremely fatiguing, and it moreover requires the exertion of considerable strains on the user's back when he has raised the snow-laden scoop off the ground and is straightening his back during the action of tossing the snow off to one side. While such strains may not be excessive for people who are in good physical shape and have a strong back, they constitute an intolerable condition to a person who has a weak back or is not physically in good shape.

In this connection, the provision of conventional snow shovels with auxiliary handles for the specific purpose of minimizing the back strain problems has previously been suggested. For example, modified snow shovels equipped with auxiliary handle constructions of one type or another are disclosed in Bickley U.S. Pat. Nos. 2,521,441, Steeb 3,082,554 and Bohler 3,751,094. The basic concept of providing an auxiliary handle construction on various types of general purpose shovels and similar material-handling devices was, of course, not new even at the time of the first of the above-mentioned patents. It is shown, for example, by Beale U.S. Pat. Nos. 62,594 and Gardner 161,678 (both already more than a century old) for pitchforks, and by Williams U.S. Pat. Nos. 725,905, Clark 875,504, Sizemore 1,449,702 and Spencer 2,416,414 (all between 30 and 75 years old) for shovels. Nevertheless, as far as applicant is aware, no such modified snow shovels are currently commercially available, presumably either because manufacturing difficulties have been encountered or because the respective constructions have not in practice proved to be as efficacious in the attainment of their stated purposes as they seemed to be on paper.

It is an object of the present invention, therefore, to provide an improved snow shovel having both a conventional main handle and a novel auxiliary handle which coact in such a manner as to enable the shovel to be easily manipulated by the user without his having to bend over or unduly strain his back in the shoveling operation.

It is also an object of the present invention to provide a snow shovel with both a main handle and an auxiliary handle as aforesaid, which is easy and economical to manufacture.

It is another object of the present invention to provide a snow shovel having a main handle and an auxiliary handle as aforesaid which is characterized by a construction of the auxiliary handle such that the same is capable of adjustment relative to the main handle so as to render the shovel adaptable for use by persons of different sizes and strengths, but which, when in use is nevertheless rigidly interconnected with the main handle.

Yet another object of the present invention is the provision of an auxiliary handle construction for snow shovels which can be manufactured as a separate entity but in such a form as to render it readily adapted for attachment to conventional snow shovels.

Generally speaking, the attainment of the aforesaid objectives of the present invention involves the provision, for a generally conventional snow shovel having a scoop and a hand grip-equipped main handle rod affixed thereto at one end, of an auxiliary handle constituted by a pair of rods which have closely juxtaposed first ends and diverge from one another in the direction of widely spaced second ends. The auxiliary handle rods have a hand grip secured thereto at the said first ends thereof and are equipped at their second ends with respective hinges for interconnecting the same to the scoop at spaced points along the top edge of the latter. The auxiliary handle further includes a rigid cross-brace bar which is swivelly connected at one end to the auxiliary handle rods at the juncture thereof with the second hand grip and has means at its other end for adjustably coupling it and releasably locking it to the main handle rod in a variety of different adjustment positions. In accordance with one aspect of the present invention, the auxiliary handle is an integral part of a modified snow shovel, with the hinges of the auxiliary handle rods being fixed, by riveting, welding or the like, to the scoop, and the main handle rod being equipped with a guide track to accommodate a slide element of the coupling means for the cross-brace bar. In accordance with another aspect of the present invention, the auxiliary handle is an entity per se designed for addition to a conventional snow shovel, with the hinges of the auxiliary handle rods and the coupling means at the free end of the cross-brace bar being provided with means, preferably quick-disconnect means, for releasably attaching them to the scoop and the main handle rod, respectively.

The foregoing and other objects, characteristics and advantages of the present invention will be more clearly understood fron the following detailed description thereof when read in conjunction with the accompanying drawings, in which:

FIG. 1 is a perspective illustration of a modified snow shovel in accordance with one embodiment of the present invention, with the auxiliary handle being shown connected into an operating position thereof;

FIG. 2 is a similar view of the shovel illustrated in FIG. 1 but shows the auxiliary handle disconnected from the main handle and folded thereagainst when the shovel is not in use;

FIG. 3 is a side elevational view of the snow shovel according to the present invention shown in FIG. 1, parts being broken away and shown in section to illustrate constructional details;

FIG. 4 is a fragmentary sectional view taken along the line 4—4 in FIG. 1;

FIG. 5 is a fragmentary, partly sectional, perspective illustration, drawn to an enlarged scale, of a portion of the structure shown in FIG. 1 and illustrates the coupling of the cross-brace bar of the auxiliary handle to the main handle of the shovel; FIGS. 6 and 7 are sectional views taken, respectively, along the lines 6—6 and 7—7 in FIG. 5;

FIG. 8 is an exploded perspective view, similar to FIG. 5, which shows the manner of coupling and decoupling of the cross-brace bar to the main handle of the shovel;

FIG. 9 is an exploded perspective view of a conventional snow shovel and a separate auxiliary handle therefor;

FIG. 10 is a perspective view of the shovel and auxiliary handle of FIG. 9 in assembled condition;

FIG. 11 is a fragmentary sectional view taken along the line 11—11 in FIG. 10;

FIG. 12 is a fragmentary perspective view of a portion of the structure shown in FIG. 10 and illustrates the manner of securing the cross-brace bar of the auxiliary handle to the main handle rod; and FIGS. 13 and 14 are fragmentary side views of a modified form of the cross-brace bar in the conditions of use and non-use thereof, respectively.

Referring now to the drawings in greater detail, a snow shovel 20 which, according to one embodiment of the present invention, is a complete entity, is shown in FIGS. 1 and 2. The shovel 20 includes a scoop or blade 21, a main handle 22 rigidly secured to the scoop 21, and an auxiliary handle 23 hingedly connected to the scoop and adapted to be rigidly but releasably and adjustably fixed to the main handle 22.

Although the scoop 21 may have any desired configuration, in the illustrated embodiment it is shown (FIGS. 1 and 2) as being of generally rectangular plate-shaped configuration, with a top edge 24, a ground-engaging bottom edge 25, and opposite side edges 26 and 27. To facilitate the ability of the scoop to break up and collect snow, it is provided in its lower region with a small degree of forward concavity, as indicated at 21a in FIG. 3, and is also curved inwardly somewhat at its opposite side edges, as shown at 21b and 21c (FIG. 4). A conventional wear element 28 (FIG. 3) is affixed to the rear face of the scoop 21 at the bottom edge 25 thereof, and a handle rod-receiving socket member 29 (FIG. 4) is rigidly affixed to the rear face of the scoop adjacent the top edge 24 thereof.

The main handle 22 of the shovel is shown as being in the form of a tubular rod 30 (preferably of aluminum tubing for lightness of weight) one end of which is rigidly affixed to the scoop 21 adjacent the top edge 24 thereof by being received in the socket member 29 and secured thereto by crimping, bolts or otherwise. At its other end, the main handle rod 30 carries the usual hand grip 31. For a reason which will become clear as the description proceeds, the main handle rod 30 is provided on its frontwardly directed face with a flat region 30a (FIGS. 5 and 8) extending approximately from the vicinity of the handle grip 31 down along about two-thirds of the length of the rod.

Affixed in any suitable manner to the flat surface section 30a of the main handle rod 30 is a channel member 32 which has a pair of upwardly and inwardly bent side flanges 33 and 34 and a central web 35, the side flanges defining a pair of tracks 33a and 34a. The central web 35 of the channel member 32 is provided with a plurality of parallel holes 36 aligned with one another longitudinally of the channel member. Correspondingly, the main handle rod 30 is provided with a like number of holes 37 in the region of the flat surface portion 30a and with another like number of holes 38 in the diametrically opposite rear surface portion of the rod. The respective sets of holes 36, 37 and 38 are axially aligned with one another, and preferably five holes are provided in each set.

The auxiliary handle 23 includes a pair of rods 39 and 40 which have respective first ends 39a and 40a closely juxtaposed to one another and diverge therefrom in the direction of their second ends 39b and 40b. The latter, by virtue of their length and angle of divergence, are thus relatively widely spaced, and preferably the distance therebetween is just somewhat less than the length of the top edge 24 of the scoop (or, if that edge is not rectilinear, then somewhat less than the linear distance between the side edges 26 and 27 of the scoop). At their said second ends, furthermore, the auxiliary handle rods 39 and 40 are provided with respective hinges 41 and 42, with one hinge flap member in each case being rigidly secured by respective rivets 43 and 44 (or alternatively by nuts and bolts or by welding) to the scoop adjacent the top edge 24 thereof. A second hand grip 45 is affixed to the auxiliary handle rods at their first ends 39a and 40a and projects therefrom in a direction generally away from the second ends 39b and 40b.

Pivotally or swivelly connected, as by means of a pin 46a, with the auxiliary handle rods 39 and 40 at the juncture thereof with the handle grip 45 is one end of a cross-brace bar 46. At its other end, the cross-brace bar 46 carries a flap or equivalent rigid element 47 which is hingedly connected to the bar at 48 and is of a thickness to enable it to be freely but smoothly slidably received in the tracks 33a and 34a of the channel member 32 affixed to the main handle rod 30. The slide member 47 is provided with a central hole or aperture 49 so positioned that when the slide member is inserted into the trackway 33a–34a, the hole can be selectively aligned with the holes 36, 37 and 38. When the hole 49 and one group of holes 36, 37 and 38 are so aligned, the threaded shank 50 of a headed bolt 51 can be fitted through the aligned holes, which will preferably be done from the rear face of the main handle rod 30. The shank 50 must, of course, be sufficiently long to protrude beyond the front face of the slide member 47 so as to enable a wing nut 52 or the like to be screwed onto the projecting end of the bolt shank and tightened against the slide member in order to lock the cross-brace bar 46 to the main handle rod 30. As a practical matter, a bolt having a shank long enough to project about ⅜ to ½ inch beyond the slide member 47 will be adequate.

It will be understood, therefore, that when the shovel 20 is not to be used, the cross-brace bar 46 is disconnected from the main handle rod 30. To this end, the wing nut 52 is loosened and unscrewed from the bolt shank 50, the latter is withdrawn rearwardly at least just enough to clear the slide member 47, and the latter is slid down and out of the trackway 33a–34a as indicated by the arrow A in FIG. 8. Once the slide member 47 is clear of the channel member 32, the cross-brace bar 46 is swung downwardly about the pivot pin 46a and permitted to hang between the auxiliary handle rods 39 and 40 (FIG. 2), and the bolt 51 is again pushed through the holes (or through any desired aligned group if it was completely withdrawn) and the wing nut screwed onto the protruding tip of the shank 50 to prevent inadvertent loss of these elements. The auxiliary handle 23 is then leaned over against the main handle rod 30, if desired being also loosely tied or clipped thereto to prevent inadvertent separation therefrom, so as to bring the shovel to a compact state illustrated in FIG. 2 in which it can be easily stored.

To make the shovel 20 ready for use, the aforesaid procedure is reversed. Thus, the auxiliary handle 23 is first tilted away from the main handle rod 30, the wing nut 52 is unscrewed and the bolt 50 retracted, the cross-brace bar 46 is swung up about the pin 46a, and the slide member is inserted into the tracks 33a and 34a as indicated by the arrow B in FIG. 8. The hole 49 in the slide member 47 is then lined up with the desired one of the groups of holes 36–37–38 (the locations of these holes, it should be noted, correspond to the available series of elevated positions of the cross-brace bar 46 between the lowermost horizontal one and the uppermost maximally upwardly inclined one shown in phantom outline in FIG. 3 at 46' and 46"), so as to locate the auxiliary handle 23 at the desired inclination to the main handle rod 30 and thereby to locate the hand grip 45 at the desired elevation relative to and spacing from the hand grip 31. The selection of any given one of these positions for each user will, of course, be governed by the size of the user and by whatever arrangement makes him feel most comfortable. Once the slide member is properly located, the bolt 51 is pushed through the then aligned group of holes 38–37–36–49 and the wing nut is screwed onto the protruding tip end of the bolt shank 50 and tightened against the slide member 47.

The manner of use of the shovel 20 will now be readily apparent. After a mass of snow has been accumulated against the front face of the scoop 21, the user assumes a stance to one side of the shovel and grabs the hand grip 31 with one hand and the hand grip 45 with the other. He then pulls up on the auxiliary handle 23 and simultaneously pushes down on the main handle 22, and by virtue of the leverage provided by the rigid mechanical triangular system 22–23–46 is easily able, while standing erect and without bending over, to lift the load of snow and dispose of it to one side or the other of the area being cleared.

It might be noted at this point that some refinements are possible in the structure so far discussed. Thus, as a safety measure the top end of the channel member 32 may be closed off or blocked by a suitable end plate or stop member (not shown) to prevent the slide member 47 from suddenly shooting out of the trackway 33a–34a if the bolt shank 50 should accidentally be sheared off or shift out of the hole 49 because the wing nut 52 somehow came off. Also, other locking means, including any suitable quick-disconnect means such as a clamp or the like, can be used in lieu of the illustrated nut and bolt arrangement, to releasably secure the cross-brace 46 or its associated coupling means 47 to the main handle rod 30 in the various adjusted positions.

As previously indicated herein, in addition to the provision of a snow shovel having the described auxiliary handle as an integral part thereof, it is contemplated in accordance with another aspect of the present invention to provide such an auxiliary handle construction which can be produced and marketed as an independent entity and would be adapted for use with any conventional snow shovel having in general a scoop and a main handle such as those of the shovel 20 illustrated in FIGS. 1 and 2. This embodiment of the present invention is illustrated in FIGS. 9 to 12.

More particularly, as shown in FIG. 9, the auxiliary handle 53 is a separate unit with respect to the snow shovel 20' which, like the shovel 20, has a scoop or blade 21' and a main handle 22' in the form of a rod 30' having at its free end a hand grip 31'. The auxiliary handle 53, like the auxiliary handle 23, includes a pair of preferably tubular aluminum auxiliary handle rods 54 and 55 having respective closely juxtaposed first ends 54a and 55a and respective widely spaced second ends 54b and 55b, and hand grip 56 secured to the first ends of the auxiliary handle rods 54 and 55, and a cross-brace bar 57 having one end pivotally or swivelly connected at 58 to the auxiliary handle rods at the juncture thereof with the hand grip 56. Since the auxiliary handle according to this embodiment of the invention is not an integral part of a shovel, however, respective quick-disconnect coupling means 59 are provided at the second ends of the auxiliary handle rods 54 and 55, and a quick-disconnect coupling means 60 is provided at the free end of the cross-brace bar 57.

Referring now to FIG. 11, each of the coupling means 59 (which are identical) includes a first jaw member 61 which is hinged at 62 to the respective auxiliary handle rod and on its front surface adjacent its free edge region carries a gripping pad 63 of rubber, plastic or comparable high friction, preferably resilient material. The jaw member 61 intermediate its ends but closer to the hinged end has a pair of pivot journals 64 which pivotally support at 65 a second jaw member 66 intermediate the ends thereof. Like the first jaw member 61, the second jaw member 66 in its free end region carries a gripping pad 67 of high friction material. The jaw member 61 is further provided in the section 61a thereof between the pivot mounting 64–65 and the hinge 62 with a tapped hole through which is threaded the shank 68a of a screw bolt 68, the tip end of the shank bearing against the shorter section 66a of the second jaw member 66.

It will be apparent, therefore, that in order to connect the auxiliary handle 53 to the scoop 21' of the shovel 20', the screw bolts 68 of the coupling means 59 are partly unscrewed from the jaw members 61, permitting the jaw members 66 to be separated somewhat from the jaw members 61 so as to enable the upper edge region of the scoop to be inserted between the pairs of jaw members. Thereafter, the screw bolts 68 are again protracted through the jaw members 61, and with the tips of the shanks 68a bearing against the portions 66a of the pivoted jaw members 66, the latter are pivoted so as to bring their respective friction gripping pads 67 into pressing engagement with the front face of the scoop, thereby to cause the latter to be gripped in a slip-proof manner by the respective paired jaw members 61 and 66.

The quick-disconnect coupling means 60 provided at the free end of the cross-brace bar 57 is best shown in FIGS. 9 and 12. In the illustrated form, the coupling means 60 is in the nature of a hose or pipe clamp and includes a strap having a circular portion 69 dimensioned to encircle the main handle rod 30' and terminating in a pair of straight end portions 69a and 69b, the latter being provided with corresponding aligned apertures therein to accommodate the shank 70a of a headed screw bolt 70. The circular portion 69 of the clamp strap is hinged to the cross-brace bar at 71.

It will be readily apparent, therefore, that when the coupling means 60 is to be connected to the main handle rod 30', first the clamp strap 69, with the bolt 70 removed, is expanded and fitted about the rod. The shank 70a of the bolt 70 is then inserted through the openings in the end portions 69a and 69b of the strap from one side, and a wing nut 72 or the like is screwed onto the protruding tip end region of the bolt shank and tightened against the proximate one of the end portions of the strap so as to tighten the circular portion thereof against the periphery of the main handle rod and thereby to securely lock the cross-brace bar to the rod. Like the cross-brace bar 46, the bar 57 can be adjusted to a number of different positions by loosening the clamp strap 69 and then retightening it after it has been slid up or down along the main handle rod as desired. Here, it should be noted, no track-forming channel member or groups of aligned holes in the main handle rod are required. The same will be true, of course, in the case of a shovel 20 which, though having the auxiliary handle permanently secured to the scoop, is to be provided with a quick-disconnect coupling means like the clamp 60 at the free end of the cross-brace bar rather than with a track-riding slide member such as the element 47.

Pursuant to a further refinement of the present invention, in either form of the auxiliary handle (23 or 53) the rigid cross-brace bar (46 or 57), which has been shown as being a unitary structural element, need not be such but may, as shown in FIGS. 13 and 14, be a collapsible structure 73 composed of two end to end abuttable sections 73a and 73b articulated to each other by an upwardly projecting hinge connection 74. In order to enable the bar 73 to be rigidified when in use, the sections 73a and 73b thereof are provided, preferably at a location opposite the hinge elements, with cooperable releasable locking means 75. In the illustrated embodiment the locking means includes a pair of correspondingly apertured lugs 76 and 77 rigidly affixed to the respective cross-brace bar sections 73a and 73b, and a headed screw bolt 78. The shank 78a of the bolt is adapted to be extended through those apertures, and the bolt is secured in place by being screwed into the aperture 76a (FIG. 14) which is tapped for that purpose. Alternatively, of course, the locking could be effected by means of a nut (not shown) tightened on the tip end region of the bolt shank 78a against the lug 76. Again alternatively, the locking means could just as well be a latch and pin construction or the like. By virtue of this sectional construction of the cross-brace bar 73, therefore (which is nevertheless contemplated as being encompassed by the term "rigid" as used herein), the same can be easily collapsed from the state shown in FIG. 13 to the state shown in FIG. 14 when the shovel is to be taken out of use, which will enable the auxiliary handle to be leaned up against the main handle without the cross-brace bar first having to be disconnected from the latter.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. A snow shovel, comprising a plate-shaped scoop having a top edge, a bottom ground-engaging edge, and opposite side edges, a main handle rod rigidly affixed at one of its ends to the medial region of said scoop, a first hand grip secured to said main handle rod at the other end thereof, a pair of coplanar auxiliary handle rods located frontwardly of said main handle rod and having respective first and second ends, said auxiliary handle rods being closely juxtaposed to one another at said first ends and diverging from one another in the direction of said second ends, the lengths of said auxiliary handle rods and the angle of divergence thereof disposing said second ends of said auxiliary handle rods at a spacing from each other approximating the distance between said side edges of said scoop, a second hand grip secured to said auxiliary handle rods at said first ends thereof and projecting therefrom in a direction generally away from said second ends of said auxiliary handle rods, respective hinge means interconnected between said second ends of said auxiliary handle rods and said scoop adjacent said top edge thereof, a rigid cross-brace bar, means pivotally connecting said cross-brace bar at one of its ends to said auxiliary handle rods adjacent the juncture thereof with said second hand grip, coupling means hingedly connected with said cross-brace bar at the other of its ends and engaging said main handle rod, and means for releasably locking said coupling means to said main handle rod, whereby said coupling means can be adjusted to a plurality of positions along said main handle rod for adjusting the angular orientation of said cross-brace bar between said main handle rod and said auxiliary handle rods and thereby the disposition of said auxiliary handle rods and said second hand grip relative to said main handle rod and said first hand grip.

2. A snow shovel according to claim 1, wherein said main handle rod is transversely apertured at a plurality of locations spaced longitudinally along said main handle rod, said coupling means comprises a plate-like member having an aperture within its expanse, and said locking means comprises a nut and bolt combination with the shank of said bolt extending through aligned apertures in said plate-like member and said main handle rod and drawing the same tight against one another.

3. A snow shovel according to claim 2, further comprising a channel member secured to said main handle rod at the front side thereof and extending longitudinally along the same, said channel member being apertured in corresponding fashion to said main handle rod, and said channel member further defining a longitudinally extending trackway for slidably receiving said plate-like member.

4. A snow shovel according to claim 1, wherein said coupling means comprises a quick-disconnect coupling.

5. A snow shovel according to claim 1, wherein said coupling means is releasably engaged with said main handle rod, and the pivotal connection of said cross-brace bar to said auxiliary handle rods is such that upon disengagement of said coupling means from said main handle rod said cross-brace bar pivots into a hanging position between said auxiliary handle rods, thereby to permit collapsing of the latter against said main handle rod.

6. A snow shovel according to claim 1, wherein said cross-brace bar includes a pair of bar sections each having a first end and a second end, hinge means articulating said bar sections to one another at said first ends thereof for movement between a position in which said bar sections are longitudinally aligned with one another with said first ends thereof in abutment against each other and a position in which said bar sections are disposed generally alongside one another with said first ends thereof spaced from each other, said second ends of said bar sections constituting said one and said other end, respectively, of said cross-brace bar, and means for releasably locking said bar sections to one another in their aligned position.

7. An auxiliary handle for use with a snow shovel having a scoop and a main handle rod; said auxiliary handle comprising a pair of auxiliary handle rods having respective first and second ends, said auxiliary handle rods being closely juxtaposed to one another at said first ends and diverging from one another in the direction of said second ends, the length of said auxiliary handle rods and the angle of divergence thereof disposing said second ends of said auxiliary handle rods at a spacing from each other approximating the distance between the opposite side edges of the scoop of a snow shovel, a hand grip secured to said auxiliary handle rods at said first ends thereof and projecting therefrom in a direction generally away from said second ends of said auxiliary handle rods, respective first coupling means each hingedly secured to said second end of a respective one of said auxiliary handle rods and adapted to be releasably connected to the scoop of a snow shovel adjacent the top edge thereof, a rigid cross-brace bar, means pivotally connecting said cross-brace bar at one of its ends to said auxiliary handle rods adjacent the juncture thereof with said hand grip, and second coupling means hingedly connected with said cross-brace bar at the other of its ends and adapted to be placed in engagement with the main handle rod of a snow shovel and releasably locked to said main handle rod, whereby upon connection of said first coupling means to said scoop said second coupling means can be connected with said main handle rod in any selected adjusted position along the latter for adjusting the angular orientation of said cross-brace bar between said main handle rod and said auxiliary handle rods and thereby the disposition of the latter and said hand grip relative to said main handle rod.

8. An auxiliary snow shovel handle according to claim 7, wherein said first and second coupling means each comprises a quick-disconnect coupling.

9. An auxiliary snow shovel handle according to claim 8, wherein each of said first coupling means includes a pair of jaws having opposed gripping surfaces and adapted to receive an edge region of said scoop therebetween, one of said jaws being hinged to the respective auxiliary handle rod, the other of said jaws being pivoted to said one jaw, and actuating means cooperating with said jaws for effecting relative displacement between said gripping surfaces.

10. An auxiliary snow shovel handle according to claim 8, wherein said second coupling means includes a pipe or hose clamplike strap having a body portion adapted to fit about said main handle rod and a pair of end portions juxtaposed to one another, said body portion being hinged to said cross-brace bar, and actuating means cooperating with said end portions for effecting relative displacement therebetween to tighten said body portion against or release it from said main handle rod.

11. An auxiliary snow shovel handle according to claim 7, wherein the pivotal connection of said cross-brace bar is such that when said second coupling means is not engaged with a main handle rod of a snow shovel said cross-brace bar pivots into a position between said auxiliary handle rods.

12. An auxiliary snow shovel handle according to claim 7, wherein said cross-brace bar includes a pair of bar sections each having a first end and a second end, hinge means articulating said bar sections to one another at said first ends thereof for movement between a position in which said bar sections are longitudinally aligned with one another with said first ends thereof in abutment against each other and a position in which said bar sections are disposed generally alongside one another with said first ends thereof spaced from each other, said second ends of said bar sections constituting said one and said other end, respectively, of said cross-brace bar, and means for releasably locking said bar sections to one another in their aligned position.

13. An auxiliary handle for use with a snow shovel having a scoop and a main handle rod; said auxiliary handle comprising a pair of auxiliary handle rods having respective first and second ends, said auxiliary handle rods being closely juxtaposed to one another at said first ends and diverging from one another in the direction of said second ends, the lengths of said auxiliary handle rods and the angle of divergence thereof disposing said second ends of said auxiliary handle rods at a spacing from each other approximating the distance between the opposite side edges of the scoop of a snow shovel, a hand grip secured to said auxiliary handle rods at said first ends thereof and projecting therefrom in a direction generally away from said second ends of said auxiliary handle rods, respective first quick-disconnect coupling means each secured to said second end of a respective one of said auxiliary handle rods and adapted to be releasably connected to the scoop of a snow shovel adjacent the top edge thereof, a rigid cross-brace bar, means pivotally connecting said cross-brace bar at one of its ends to said auxiliary handle rods adjacent the juncture thereof with said hand grip, and second quick-disconnect coupling means connected with said cross-brace bar at the other of its ends and adapted to be placed in engagement with the main handle rod of a snow shovel and releasably locked to said main handle rod, whereby upon connection of said first coupling means to said scoop said second coupling means can be connected with said main handle rod at a plurality of adjusted positions along the latter for adjusting the orientation of said cross-brace bar between said main handle rod and said auxiliary handle rods and thereby the disposition of the latter and said hand grip relative to said main handle rod.

14. A snow shovel, comprising a plate-shaped scoop having a top edge, a bottom ground-engaging edge, and opposite side edges, a main handle rod rigidly affixed at one of its ends to the medial region of said scoop, a first hand grip secured to said main handle rod at the other end thereof, a pair of coplanar auxiliary handle rods located frontwardly of said main handle rod and having respective first and second ends, said auxiliary handle rods being closely juxtaposed to one another at said first ends and diverging from one another in the direction of said second ends, the lengths of said auxiliary handle rods and the angle of divergence thereof disposing said second ends of said auxiliary handle rods at a spacing from each other approximating the distance between said side edges of said scoop, a second hand grip secured to said auxiliary handle rods at said first ends thereof and projecting therefrom in a direction generally away from said second ends of said auxiliary handle rods, respective first coupling means interconnected between said second ends of said auxiliary handle rods and said scoop adjacent said top edge thereof, a rigid cross-brace bar, means pivotally connecting said cross-brace bar at one of its ends to said auxiliary handle rods adjacent the juncture thereof with said second hand grip, second coupling means connected with said cross-brace bar at the other of its ends and engaging said main handle rod, and quick-disconnect means for releasably locking said second coupling means to said main handle rod, whereby said second coupling means can be adjusted to a plurality of positions along said main handle rod for adjusting the orientation of said cross-brace bar between said main handle rod and said auxiliary handle rods and thereby the disposition of said auxiliary handle rods and said second hand grip relative to said main handle rod and said first hand grip.

* * * * *